(12) United States Patent
Yoneoka

(10) Patent No.: US 12,282,523 B2
(45) Date of Patent: Apr. 22, 2025

(54) INFORMATION PROCESSING SYSTEM, INFORMATION PROCESSING METHOD, AND NON-TRANSITORY COMPUTER-READABLE STORAGE MEDIUM STORING PROGRAM OF SEARCHING FOR OPTIMAL SOLUTION OF COMBINATORIAL OPTIMIZATION PROBLEM USING MULTIPLE SEARCH DEVICES

(71) Applicant: FUJITSU LIMITED, Kawasaki (JP)

(72) Inventor: Noboru Yoneoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 917 days.

(21) Appl. No.: 17/160,440

(22) Filed: Jan. 28, 2021

(65) Prior Publication Data

US 2021/0286328 A1  Sep. 16, 2021

(30) Foreign Application Priority Data

Mar. 11, 2020 (JP) .................. 2020-042328

(51) Int. Cl.
  *G06F 17/11* (2006.01)
(52) U.S. Cl.
  CPC ................... *G06F 17/11* (2013.01)
(58) Field of Classification Search
  CPC .. G06F 17/11; G06F 9/28; G06N 5/01; G06N 10/60
  See application file for complete search history.

(56) References Cited

U.S. PATENT DOCUMENTS

| 2016/0335568 A1* | 11/2016 | Bailey ................. G06Q 10/047 |
| 2018/0005114 A1 | 1/2018 | Tomita et al. |
| 2018/0324607 A1* | 11/2018 | Rengarajan ........... H04W 24/02 |
| 2019/0155330 A1 | 5/2019 | Yamaoka et al. |
| 2019/0235834 A1 | 8/2019 | Yoneoka |

(Continued)

FOREIGN PATENT DOCUMENTS

| CN | 110390413 | 10/2019 |
| JP | 2019-071119 A | 5/2019 |

(Continued)

OTHER PUBLICATIONS

Onbaşoğlu, Esin, and Linet Özdamar. "Parallel simulated annealing algorithms in global optimization." Journal of global optimization 19 (2001): 27-50. (Year: 2001).*

(Continued)

*Primary Examiner* — Andrew Caldwell
*Assistant Examiner* — Carlo Waje
(74) *Attorney, Agent, or Firm* — Fujitsu Intellectual Property Center

(57) ABSTRACT

An information processing apparatus includes a memory and a processor. The processor configured to acquire, among a plurality of solutions, a first solution corresponding to a best value among values of a plurality of the energy functions corresponding to the plurality of solutions, each of the plurality of solutions being represented by a value of each of a plurality of state variables included in an energy function, generate a first state variable string based on the first solution, and search for a solution with the first state variable string as a start state.

5 Claims, 14 Drawing Sheets

(56) References Cited

U.S. PATENT DOCUMENTS

2019/0278829 A1  9/2019  Takatsu

FOREIGN PATENT DOCUMENTS

| JP | 2019-133517 A | 8/2019 |
| WO | 2017/033263 A1 | 3/2017 |

OTHER PUBLICATIONS

Chen, H., Flann, N.S., & Watson, D.W. (1998). Parallel Genetic Simulated Annealing: A Massively Parallel SIMD Algorithm. IEEE Trans. Parallel Distributed Syst., 9, 126-136. (Year: 1998).*

Yang Wang et al., "Path Relinking for Unconstrained Binary Quadratic Programming", European Journal of Operational Research 223, pp. 595-604, 2012, Elsevier (Total 10 pages).

Naka, Hidekazu et al., "Cooperative Searching in Parallel Tabu Search and Its effectiveness", Institute of Electronics, Information and Communication Engineers Technical Research Report, pp. 1-6, vol. 107, No. 118, Jun. 21, 2007, with English Translation.

Japanese Office Action mailed Dec. 5, 2023 for corresponding Japanese Patent Application No. 2020-042328, with English Translation, 6 pages.

Chen, Ding-Jun et al., "Parallelizing simulated annealing algorithms based on high-performance computer", Journal of Global Optimization, Kluwer Academic Publishers, Do, vol. 39, No. 2, Feb. 20, 2007, XP019529771, pp. 261-289.

Ferreiro, A. M. et al. "An efficient implementation of parallel simulated annealing algorithm in GPUs", Journal of Global Optimization, vol. 57, No. 3, Nov. 2013, XP055821214, pp. 863-890.

Extended European Search Report dated Jul. 13, 2021 for corresponding European Patent Application No. 21154730.2, 8 pages.

Chinese Office Action issued on Jul. 13, 2024 for corresponding Chinese Patent Application No. 202110175873.6, 18 pages. ***Please note NPL "Parallelizing simulated annealing algorithms based on high-performance computer", and US-2018-0324607-A1 cited herewith, were previously cited on Sep. 30, 2021 and Feb. 26, 2024, respectively.

Chinese Office Action issued Jan. 23, 2025 for corresponding Chinese Patent Application No. 202110175873.6, 22 pages.

* cited by examiner

FIG. 5

| # | STATE | ENERGY VALUE |
|---|---|---|
| 0 | X0 | E(X0) |
| 1 | X1 | E(X1) |
| 2 | X2 | E(X2) |
| 3 | X3 | E(X3) |
| ⋮ | ⋮ | ⋮ |
| k-1 | X(k-1) | E(X(k-1)) |

SOLUTION POOL

141

INFORMATION PROCESSING SYSTEM, INFORMATION PROCESSING METHOD, AND NON-TRANSITORY COMPUTER-READABLE STORAGE MEDIUM STORING PROGRAM OF SEARCHING FOR OPTIMAL SOLUTION OF COMBINATORIAL OPTIMIZATION PROBLEM USING MULTIPLE SEARCH DEVICES

CROSS-REFERENCE TO RELATED APPLICATION

This application is based upon and claims the benefit of priority of the prior Japanese Patent Application No. 2020-42328, filed on Mar. 11, 2020, the entire contents of which are incorporated herein by reference.

FIELD

The embodiments discussed herein are related to an information processing apparatus, an information processing method, and a non-transitory computer-readable storage medium.

BACKGROUND

There is an information processing apparatus that performs calculation by replacing a multivariable combinatorial optimization problem that is difficult to handle with a Neumann computer with an Ising model which is a model representing a behavior of a spin of a magnetic substance. As a method for solving the problem replaced with the Ising model in a practical time, there are various search algorithms such as simulated annealing (SA).

For example, an information processing apparatus that searches for a solution of the combinatorial optimization problem by using an extended ensemble method has been suggested. An information processing system in which ground state searches are independently repeated by a plurality of space expansion type calculators, results are sequentially accumulated in a time expansion type calculator, and a best solution is finally selected.

Related techniques are disclosed in for example Japanese Laid-open Patent Publication No. 2019-71119 and International Publication Pamphlet No. WO 2017/033263.

SUMMARY

According to an aspect of the embodiments, an information processing apparatus includes a memory; and a processor coupled to the memory. The processor configured to: acquire, among a plurality of solutions, a first solution corresponding to a best value among values of a plurality of the energy functions corresponding to the plurality of solutions, each of the plurality of solutions being represented by a value of each of a plurality of state variables included in an energy function, generate a first state variable string based on the first solution, and search for a solution with the first state variable string as a start state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a solution pool.

DESCRIPTION OF EMBODIMENTS

In the related art, in the method for just performing the ground state searches independently by the plurality of calculators and selecting the best solution from among the obtained solutions, since there is a low possibility of obtaining the optimal solution or it takes time until the optimal solution is obtained, sufficient solution finding performance may not be obtained.

An object of an aspect of the present disclosure is to provide an information processing system, an information processing method, and a program which are capable of improving solution finding performance.

Hereinafter, embodiments will be described with reference to the drawings.

First Embodiment

A first embodiment will be described.

Figure 1:
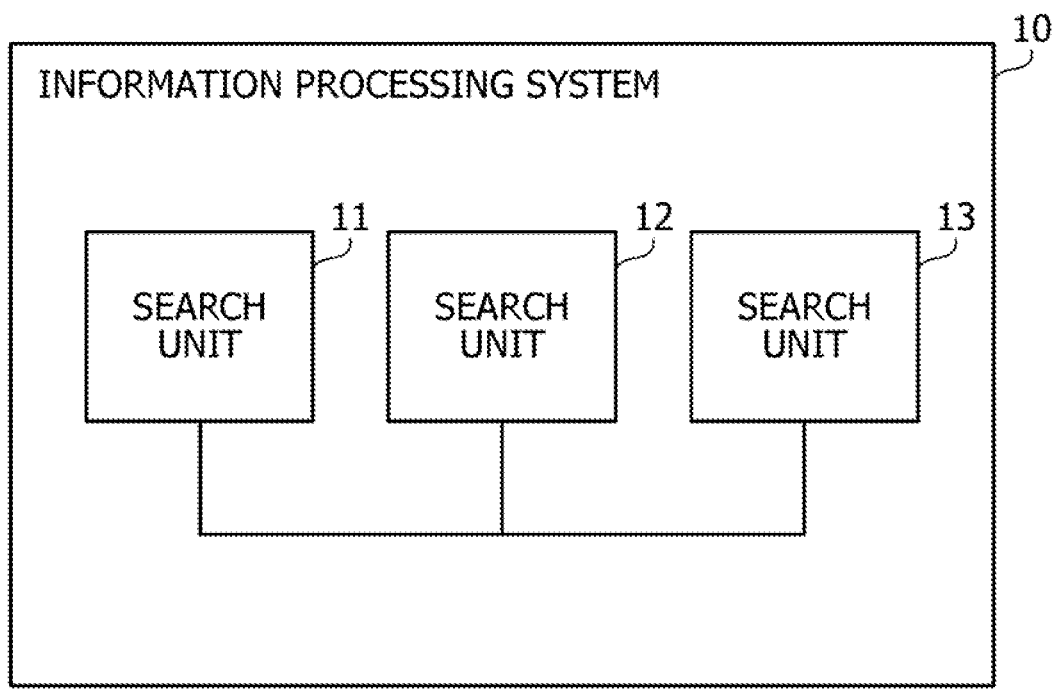
FIG. 1 is a diagram illustrating an example of an information processing system according to a first embodiment.

FIG. 1 is a diagram illustrating an example of an information processing system according to a first embodiment.

An information processing system 10 finds a solution of a combinatorial optimization problem, and outputs the found solution. The information processing system 10 includes search units 11, 12, and 13. Each of the search units 11, 12, and 13 is realized by, for example, a semiconductor integrated circuit such as a central processing unit (CPU), a graphics processing unit (GPU), a digital signal processor (DSP), an application-specific integrated circuit (ASIC), or a field-programmable gate array (FPGA). Each of the search units 11, 12, and 13 may include a storage unit such as a random-access memory (RAM) or a register. For example, a plurality of search circuits realized by using the semiconductor integrated circuits such as the FPGAs may function as the search units 11, 12, and 13, respectively. The number of search units included in the information processing system 10 may be two, or may be four or more.

Each of the search units 11, 12, and 13 may share at least a part of information retained by each of the search units 11, 12, and 13 with the other search units via, for example, a shared storage device (not illustrated). Alternatively, each of the search units 11, 12, and 13 may have a communication function of communicating with the other search units, and may transmit and receive information to and from the other search units.

The search units 11, 12, and 13 search for solutions represented by values of a plurality of state variables included in an energy function, respectively. The state variable is a binary variable having a value of "0" or "1". The search units 11, 12, and 13 search for optimal solutions represented by the values of the plurality of state variables included in the energy function based on an Ising-type energy function that formulates the combinatorial optimization problem, respectively. The energy function is also referred to as an evaluation function or an objective function. Values of the energy function represent energy values corresponding to states of an Ising model represented by values of a plurality of variables. The energy value may be referred to as an evaluation value. For example, the combinatorial optimization problem is formulated as a problem for finding a solution that minimizes the energy value. In this case, the solution that minimizes the energy value represents a ground state of the Ising model, and corresponds to an optimal solution of the combinatorial optimization problem. An Ising-type energy function E(x) is represented by, for example,
Equation (1).

[Equation 1]

$$E(x) = -\sum_{(i,j)} W_{ij} x_i x_j - \sum_i b_i x_i \quad (1)$$

A state vector x has a plurality of state variables as elements, and represents the state of the Ising model. In the case of a problem of maximizing the energy value, a sign of the energy function may be reversed.

A first term on a right side of Equation (1) is obtained by integrating a product of values of two state variables and a weighting coefficient without omission and duplication for all combinations of two state variables that are selectable from all state variables. $x_i$ is an i-th state variable. $x_j$ is a j-th state variable. $W_{ij}$ is a weight between the i-th state variable and the j-th state variable or a weighting coefficient indicating a strength of coupling.

A second term on the right side of Equation (1) is a sum of products of values of individual state variables and respective bias coefficients of all the state variables, $b_i$ indicates the bias coefficient for the i-th state variable.

For example, "−1" of a spin in the Ising model corresponds to a value "0" of the state variable. "+1" of the spin in the Ising model corresponds to a value "1" of the state variable. Thus, the state variable may also be referred to as a bit having a value of 0 or 1.

Problem data indicating an identical problem is input to the search units 11, 12, and 13. For example, state vectors different from each other are given to the search units 11, 12, and 13 from the outside, as initial states at first search start points in time in the respective search units 11, 12, and 13.

Each of The search units 11, 12, and 13 search for optimal solutions of the identical combinatorial optimization problem by predetermined search methods. Examples of the search method include SA, genetic algorithms (GA), simulated quantum annealing (SQA), tabu search, and the like. The search methods respectively used by the search units 11, 12, and 13 may be identical or different. The search method is not limited to the exemplified methods, and another search method may be used.

Each of the search units 11, 12, and 13 acquires, from among a plurality of solutions obtained by the search units 11, 12, and 13, a first solution corresponding to a best energy value among values of a plurality of energy functions corresponding to the plurality of solutions, for example, among a plurality of energy values. For example, each of the search units 11, 12, and 13 preferentially retains a predetermined number of solutions having good energy values among the solutions found in the searches by the search unit. Each of the search units 11, 12, and 13 supplies a solution corresponding to the best energy value retained by the search unit to the other search units, and acquires solutions corresponding to the best energy values retained by the other search units from the other search units. For example, in the problem of minimizing the energy value, the best energy values are minimum energy values among the plurality of energy values corresponding to the plurality of solutions retained by the search units 11, 12, and 13. In this case, best solutions are solutions corresponding to the minimum energy values among the solutions retained by the search units 11, 12, and 13.

Each of the search units 11, 12, and 13 compares the energy value of the solution acquired from the other search units with the energy value of the best solution retained by the search unit. When the energy value of the solution acquired from the other search units is better than the energy value of the best solution retained by the search unit, each of the search units 11, 12, and 13 acquires, as the first solution, the solution acquired from the other search units. When the energy value of the solution acquired from the other search units is worse than the energy value of the best solution retained by the search unit or both the energy values are identical, each of the search units 11, 12, and 13 acquires, as the first solution, the best solution retained by the search unit.

For example, a solution propagation unit (not illustrated) provided outside the search units 11, 12, and 13 may have a function of acquiring the first solution. In this case, the solution propagation unit collects the best solutions retained by the respective search units from the search units 11, 12, and 13, selects the first solution from among the collected solutions, and supplies the first solution to the search units 11, 12, and 13.

Each of the search units 11, 12, and 13 generates a first state variable string which is a new state variable string based on the acquired first solution. For example, the search unit 11 generates, as the first state variable string, a neighbor solution of the first solution obtained by changing a value of a part of the state variables included in the first solution. The neighbor solution may be generated based on the first solution and any solution obtained by the search unit 11. The first state variable string may be identical to a state variable string of the first solution. Each of the search units 12 and 13 generates the first state variable string similar to the search unit 11.

Each of the search units 11, 12, and 13 searches for the solution with the generated first state variable string as a start state. For example, each of the search units 11, 12, and 13 starts the search with the start state as a start point. When the solution obtained as a searching result in a certain search unit updates the best energy value obtained in the certain search unit, the solution is shared with the other search units, and the above-described processing is repeated. Alternatively, when the solution propagation unit is used and the solution obtained as the searching result in a certain search unit updates the best energy values obtained in all the search units, the solution is shared with the other search units, and the above-described processing is repeated.

When a predetermined end condition is satisfied in each of the search units 11, 12, and 13, the searches of the solutions performed by the search units 11, 12, and 13 are ended. The end condition is, for example, that a fixed time elapses from the first search start point in time. The information processing system 10 outputs, as final solutions, the plurality of solutions retained by the search units 11, 12, and 13 at an end point in time or the solution corresponding to the best energy value among the plurality of solutions.

The acquisition of the first solutions by respective the search units 11, 12, and 13, the generation of the first state variable strings based on the first solutions, and the searches of the solutions using the first state variable strings as the start states may be performed synchronously or asynchronously by respective the search units 11, 12, and 13.

In accordance with the information processing system 10, the first solutions corresponding to the best energy value among the plurality of solutions obtained by the respective search units 11, 12, and 13 are acquired. Each of the search units 11, 12, and 13 generates the first state variable string based on the first solution. Each of the search units 11, 12, and 13 searches for the solution by using the generated first state variable string as the start state.

Accordingly, solution finding performance may be improved.

A method for independently searching for the ground states by a plurality of calculators and selecting a best solution from among the obtained solutions is considered as a comparative example. However, when the ground states are just independently searched for by the plurality of calculators and the best solutions are selected from among the obtained solutions, since a possibility of obtaining the optimal solutions within a fixed time is low or it takes time to obtain the optimal solutions, the solution finding performance may not be sufficiently improved. Thus, a method for improving the solution finding performance is a problem.

Thus, in the information processing system 10, each of the search units 11, 12, and 13 decides a start state of the next search based on the best solution among the plurality of solutions obtained by the search units 11, 12, and 13. This is because it is estimated that there is a high possibility that there is the optimal solution in the vicinity of the better solution. Accordingly, a possibility of obtaining the optimal solution by any of the search units 11, 12, and 13 may be improved. For example, a possibility of obtaining the optimal solution by any of the search units 11, 12, and 13 in a fixed time is improved, and thus, a time taken to obtain the optimal solution may be reduced. In this manner, the solution finding performance of the information processing system 10 for the combinatorial optimization problem may be improved.

The search units 11, 12, and 13 may be provided in same the information processing apparatus. In this case, the respective search units 11, 12, and 13 are coupled to a bus of the information processing apparatus. For example, the search units 11, 12, and 13 share the solutions via a shared memory coupled to the bus. A function of collecting the solutions from the search units 11, 12, and 13 and supplying the solutions to the individual search units 11, 12, and 13 may be provided by a processing unit such as a CPU coupled to the bus.

Alternatively, the search units 11, 12, and 13 may be provided in a plurality of information processing apparatuses in a distribution manner. In this case, the plurality of information processing apparatuses is coupled to a network. The transmission and reception of the solutions between the search units provided in different information processing apparatuses are executed by communication interfaces provided in the respective information processing apparatuses under the control of the CPUs of the respective information processing apparatuses.

Second Embodiment

Next, a second embodiment will be described.

Figure 2:
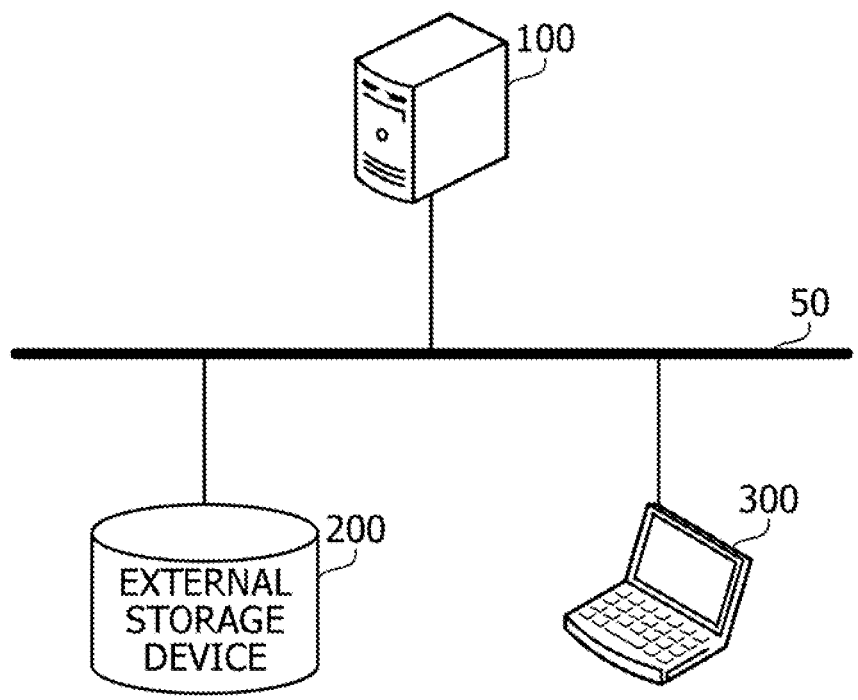
FIG. 2 is a diagram illustrating an example of an information processing system according to a second embodiment.

FIG. 2 is a diagram illustrating an example of an information processing system according to the second embodiment.

The information processing system according to the second embodiment includes a node 100, an external storage device 200, and a terminal apparatus 300. The node 100, the external storage device 200, and the terminal apparatus 300 are coupled to a network 50. The network 50 is, for example, a local area network (LAN). The network 50 may be a wide area network (WAN) or the Internet.

The node 100 is a server computer having a plurality of accelerators that each searches for solutions of a combinatorial optimization problem. The accelerator is hardware that finds, as solutions, values of a plurality of state variables that minimizes the Ising-type energy function $E(x)$ represented by Equation (1). However, a solution search function provided by the node 100 may be implemented by software.

The plurality of respective accelerators in the node 100 searches for solutions by using different search methods, for example, search algorithms. However, at least two of the plurality of accelerators may search for the solutions by using the identical search method. Examples of the search method include SA, GA, SQA, tabu search, and the like. The search method is not limited to the exemplified methods, and other search methods may be used.

The external storage device 200 is a storage that stores problem data of the combinatorial optimization problem input to the node 100 and the solutions of the combinatorial optimization problem output by the node 100. The problem data includes, for example, a weighting coefficient ($W_{ij}$) and a bias coefficient $\{bi\}$ of Equation (1). For example, the external storage device 200 includes a plurality of hard disk drives (HDDs), solid-state drives (SSDs), and the like.

The terminal apparatus 300 is a client computer operated by a user. The terminal apparatus 300 inputs data to the node 100. The data input to the node 100 by the terminal apparatus 300 includes the problem data stored in the external storage device 200. The terminal apparatus 300 presents contents of the solutions of the combinatorial optimization problem stored in the external storage device 200 to the user by displaying the contents on a display included in the terminal apparatus 300.

The information processing system according to the second embodiment is an example of the information processing system 10 according to the first embodiment. The node 100 may be considered as an example of the information processing system 10 according to the first embodiment.

Figure 3:
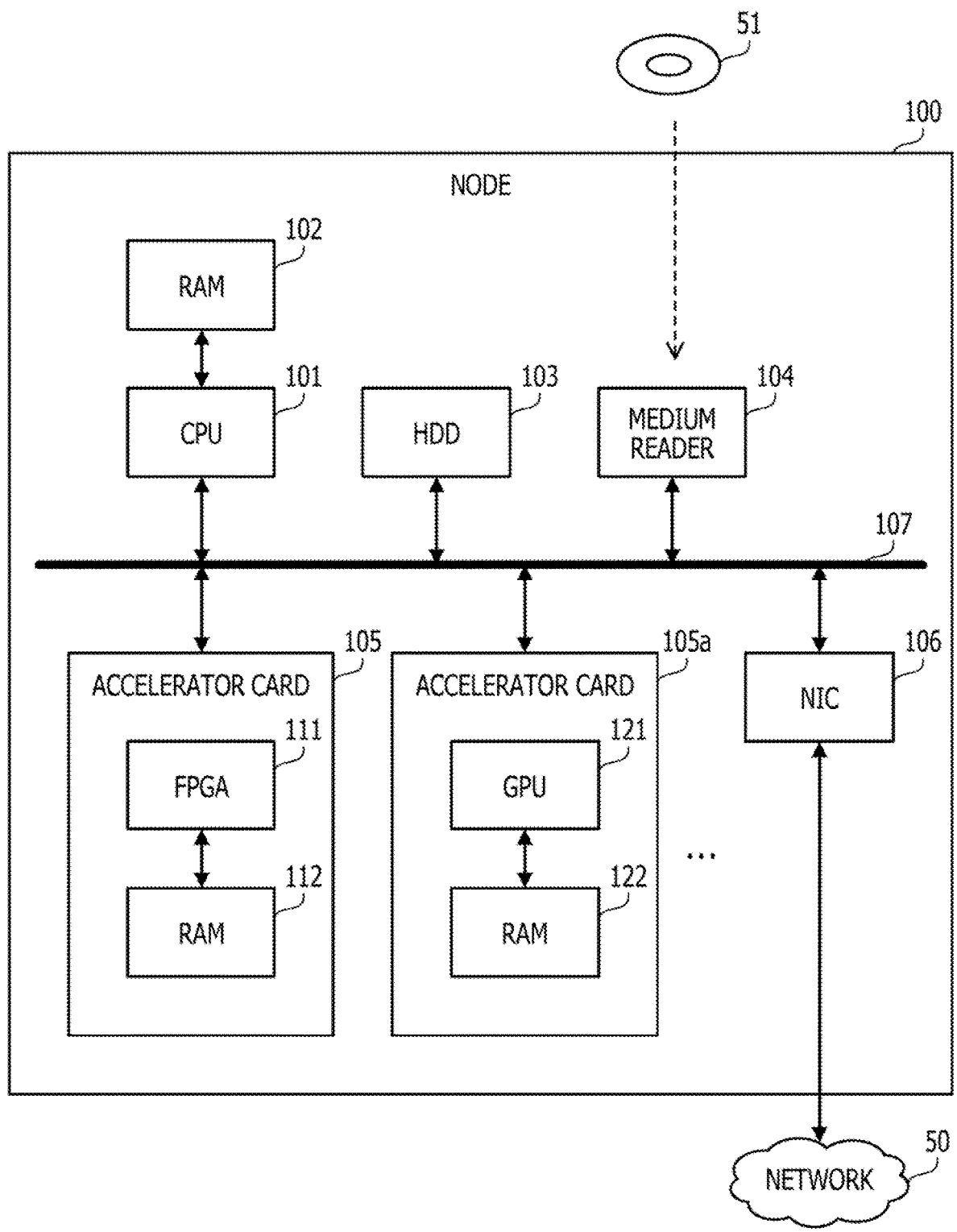
FIG. 3 is a diagram illustrating an example of hardware of a node.

FIG. 3 is a diagram illustrating an example of hardware of the node.

The node 100 includes a CPU 101, an RAM 102, a HDD 103, a medium reader 104, accelerator cards 105, 105a, ..., a network interface card (NIC) 106, and a bus 107.

The CPU 101 is a processor that executes a command of a program. The CPU 101 loads at least a part of a program or data stored in the HDD 103 into the RAM 102, and executes the program. The CPU 101 may include a plurality of processor cores. The node 100 may include a plurality of processors, Processing which will be described below may be executed in parallel by using a plurality of processors or processor cores. A set of the plurality of processors may be referred to as a "multiprocessor" or merely referred to as a "processor" in some cases.

The RAM 102 is a volatile semiconductor memory that temporarily stores the program executed by the CPU 101 and data used for the operation by the CPU 101. The node 100 may include a memory of a type different from the RAM, or include a plurality of memories.

The HDD 103 is a non-volatile storage device that stores data as well as software programs such as an operating system (OS), middleware, and application software. The node 100 may include a storage device of a different type such as a flash memory and a SSD, or include a plurality of non-volatile storage devices.

The medium reader 104 is a reading device that reads programs and data recorded in a recording medium 51. As the recording medium 51, for example, a magnetic disk, an optical disk, a magneto-optical disk (MO), a semiconductor memory, or the like may be used. The magnetic disk includes a flexible disk (FD) or an HDD. The optical disk includes a compact disk (CD) or a digital versatile disk (DVD).

The medium reader 104 copies, for example, the program and data read from the recording medium 51 to another recording medium such as the RAM 102 or the HDD 103. The read program is executed by, for example, the CPU 101. The recording medium 51 may be a portable recording medium, and may be used to distribute the program and data. The recording medium 51 and the HDD 103 may be referred to as a computer-readable recording medium.

The accelerator cards 105, 105a, ... are hardware accelerators that each search for the solutions of the combinatorial optimization problem. A search function of each of the accelerator cards 105, 105a, ... is realized by a semiconductor integrated circuit such as an FPGA, a GPU, or an ASIC. Each of the accelerator cards 105, 105a, ... includes an RAM that retains the searched solutions. For example, the accelerator card 105 includes an FPGA 111 and an RAM 112. The accelerator card 105a includes a GPU 121 and an RAM 122. As described above, accelerator cards on which different types of semiconductor integrated circuits such as an FPGA, a GPU, and an ASIC are mounted may be mixed in the node 100.

The hardware accelerator that searches for the solutions of the combinatorial optimization problem such as the accelerator cards 105, 105a, ... may be referred to as an Ising machine, a Boltzmann machine, or the like. For example, as the accelerator card for executing SAs, there is an optimization apparatus disclosed in Japanese Patent No. 6465223.

The NIC 106 is coupled to the network 50 and is a communication interface that communicates with another computer via the network 50. The NIC 106 transmits data to the external storage device 200 via the network 50 and receives data from the terminal apparatus 300. For example, the NIC 106 is coupled to a communication device such as a switch or a router belonging to the network 50 with a cable.

The bus 107 is an internal bus of the node 100. The CPU 101, the RAM 102, the HDD 103, the medium reader 104, the accelerator cards 105, 105a, ..., and the NIC 106 are coupled to the bus 107. For the bus 107, for example, Peripheral Component Interconnect Express (PCIe) is used.

Figure 4:
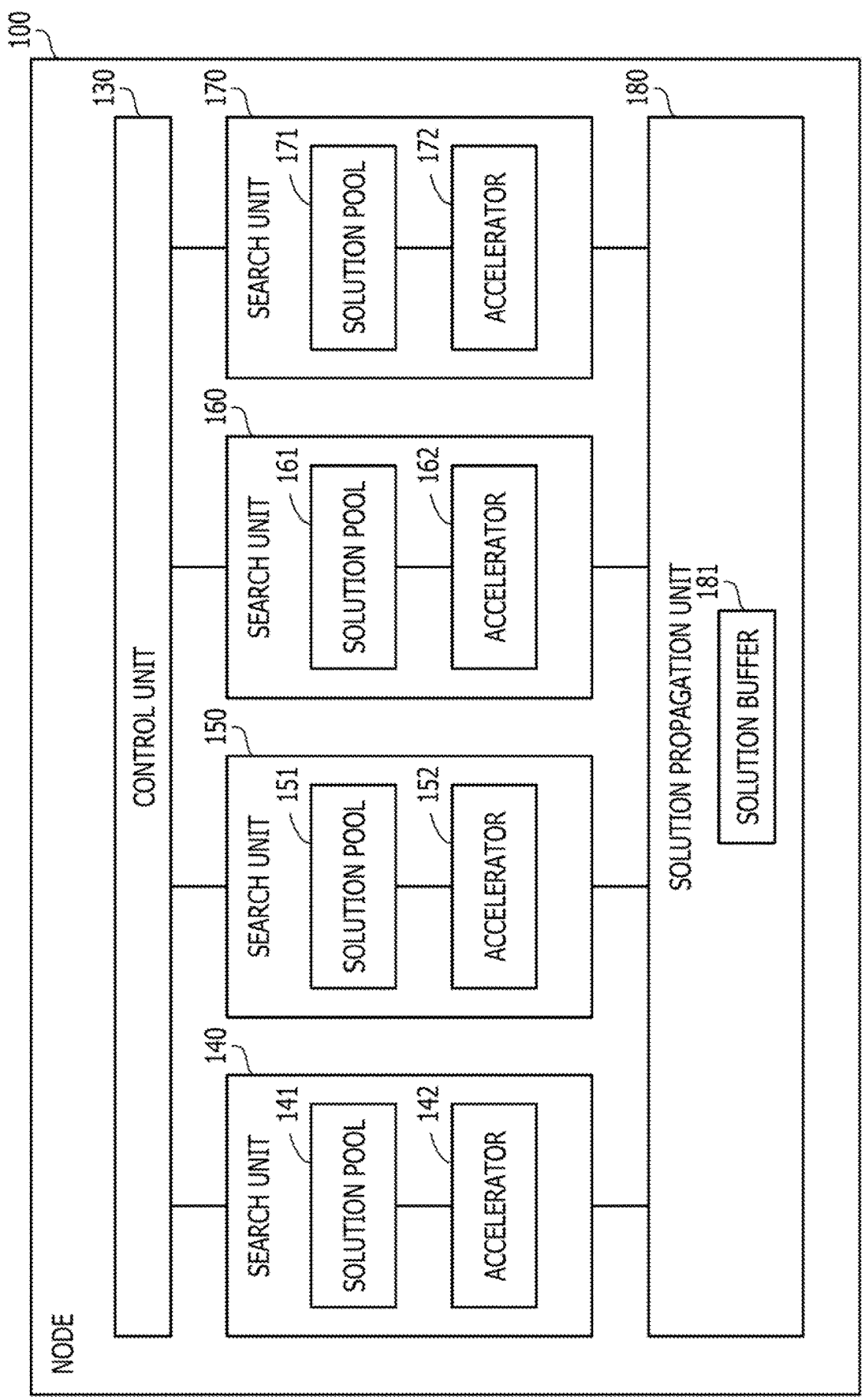
FIG. 4 is a diagram illustrating an example of functions of the node.

FIG. 4 is a diagram illustrating an example of functions of the node.

The node 100 includes a control unit 130, search units 140, 150, 160, and 170, and a solution propagation unit 180. The control unit 130 and the solution propagation unit 180 are realized by the CPU 101. One search unit is realized by one accelerator card. Although it is illustrated in the example of FIG. 4 that the node 100 includes four search units, the node 100 may include a plurality of search units other than four. As described above, at least a part of the functions of the search unit may be implemented by the CPU 101 that executes predetermined software.

The control unit 130 acquires the problem data of the combinatorial optimization problem from the terminal apparatus 300. The control unit 130 inputs the problem data and initial state variable strings to the search units 140, 150, 160, and 170, and causes the search units to search for the solutions. The identical problem data is input to the search units 140, 150, 160, and 170. The initial state variable string is an initial state at the first search start point in time in each of the search units 140, 150, 160, and 170. In each of the search unit 140, 150, 160, and 170, a first search is performed by changing a value of the state variable with the initial state variable string as the start point. The control unit 130 may input different initial state variable strings to the search units 140, 150, 160, and 170.

The control unit 130 acquires the solutions obtained as the respective searching results in the search units 140, 150, 160, and 170. The control unit 130 outputs the acquired solutions to the external storage device 200.

Each of the search units 140, 150, 160, and 170 searches for the solutions of the combinatorial optimization problem by searching for a set of the plurality of state variables that minimizes the Ising-type energy function corresponding to the combinatorial optimization problem, for example, the ground state of the Ising model.

Each of the search units 140, 150, 160, and 170 use search methods different from each other. For example, the search unit 140 uses the SQA. The search unit 150 uses the tabu search. The search unit 160 uses the SA. The search unit 170 uses the GA. However, at least two search units among the search unit 140, 150, 160, and 170 may use the identical search method. All the search units 140, 150, 160, and 170 may use the identical search method.

The search units 140, 150, 160, and 170 include solution pools 141, 151, 161, and 171, respectively. Storage areas of the RAMs over the accelerator cards corresponding to the respective search units 140, 150, 160, and 170 are used for the solution pools 141, 151, 161, and 171. The search units 140, 150, 160, and 170 include accelerators 142, 152, 162, and 172, respectively. The accelerators 142, 152, 162, and 172 are realized by the FPGAs 111, the GPUs 121, or the like over the accelerator cards corresponding to the respective search units 140, 150, 160, and 170.

The search units 140, 150, 160, and 170 search for the solutions by using the respective accelerators 142, 152, 162, and 172. The search units 140, 150, 160, and 170 preferentially retain a predetermined number of solutions having small energy values among the solutions obtained up to a current point in time in the respective solution pools 141, 151, 161, and 171.

The search units 140, 150, 160, and 170 supply solutions having a minimum energy value retained in the respective solution pools 141, 151, 161, and 171, for example, the best solutions to the solution propagation unit 180. The search units 140, 150, 160, and 170 may replace the best solutions retained in the respective solution pools 141, 151, 161, and 171 with the solution supplied from the solution propagation unit 180.

The search units 140, 150, 160, and 170 generate new solutions to be set as start states for the next search performed by the accelerators 142, 152, 162, and 172, for example, initial solutions based on the solutions retained in the respective solution pools 141, 151, 161, and 171, respectively. Each of the search units 140, 150, 160, and 170 performs the next search by the accelerator of the search unit by using the generated initial solution.

The solution propagation unit 180 transmits the solution to the search units 140, 150, 160, and 170. The solution propagation unit 180 includes a solution buffer 181. A storage area of the RAM 102 is used for the solution buffer 181. The solution buffer 181 stores one or more solutions selected by the solution propagation unit 180.

The solution propagation unit 180 preferentially records, in the solution buffer 181, a predetermined number of solutions having small energy values among the solutions supplied from the respective search units 140, 150, 160, and 170, for example, the best solutions in the search units 140, 150, 160, and 170.

The solution propagation unit 180 supplies a solution having a minimum energy value among the solutions retained in the solution buffer 181, for example, the best solution in the solution buffer 181 to the search units 140, 150, 160, and 170.

FIG. 5 is a diagram illustrating an example of the solution pool.

FIG. 5 illustrates the solution pool 141, but the solution pools 151, 161, and 171 also have similar data structures.

One record in the solution pool 141 has a state field and an energy value field. FIG. 5 illustrates a number (#) for identifying a record. The solution pool 141 retains k records. The state is the solution obtained by the accelerator 142 and is represented by a set of the values of the plurality of state variables. The state is also referred to as a state vector or a state bit string. The energy value is a value of an energy function E(x) corresponding to a state x. For example, a 0-th record of the solution pool 141 has a state "X0" and an energy value "E(X0)".

The solution buffer 181 has a data structure similar to the solution pool 141. In one example, k=16 in the solution pools 141, 151, 161, and 171, and k=4 in the solution buffer 181.

Figure 6:
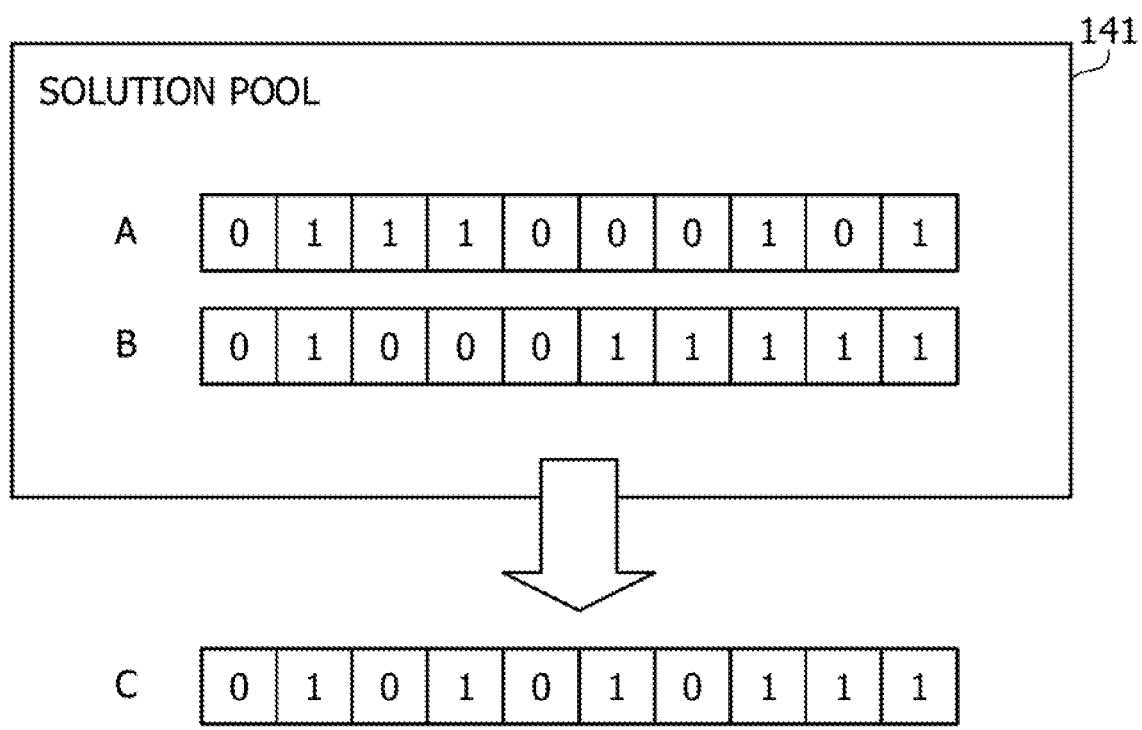
FIG. 6 is a diagram illustrating an example of a method for generating a new solution.

FIG. 6 is a diagram illustrating an example of a method for generating the new solution.

As described above, the search unit 140 randomly acquires the solutions retained in the solution pool 141, and generates the new solution to be used as the start state for the next search performed by the accelerator 142.

For example, the search unit 140 acquires states A and B, for example, solutions A and B from the solution pool 141. The search unit 140 generates a new solution C based on the solutions A and B.

For example, the search unit 140 sets a bit of the solution C corresponding to a bit having an identical value in the solutions A and B to a value identical to the bit in the solutions A and B. The search unit 140 randomly selects "0" or "1" as a value of a bit in the solution C corresponding to bits having different values in the solutions A and B. The solution C is an example of the "first state variable string" according to the first embodiment.

The generation method of FIG. 6 is processing based on an optimization strategy in which there may be some similarity between the solutions having relatively good energy values and there may be an optimal solution in the vicinity of these solutions. The following Literature may be referred to for the generation method.

Literature: Y. Wang et al, Path relinking for unconstrained binary quadratic programming, European Journal of Operational Research 223, 2012, pp. 595-604.

When only one solution is stored in the solution pool 141, the search unit 140 may generate the new solution to be set as the start state for the next search from the one solution. For example, it is also considered that the search unit 140 generates the new solution by changing a value of a part of the state variables included in the one solution.

The search units 150, 160, and 170 also generate the new solutions by a method similar to that of the search unit 140.

Next, a processing procedure of the node 100 will be described.

First, a processing procedure of the search units 140, 150, 160, and 170 will be described.

The control unit 130 inputs the initial state variable strings and the identical problem data to the search units 140, 150, 160, and 170, and causes the search units to start the search for the solutions. In a first stage, the solutions are not stored in the solution pools 141, 151, 161, and 171. Thus, the search units 140, 150, 160, and 170 perform processing of filling the respective solution pools 141, 151, 161, and 171 with the solutions of the initial state variable strings. Alternatively, the search units 140, 150, 160, and 170 may fill the respective solution pools 141, 151, 161, and 171 with the solutions generated by randomly selecting the bit of 0 or 1.

Although the search unit 140 is mainly illustrated and described below, the search units 150, 160, and 170 also execute similar processing procedures.

Figure 7:
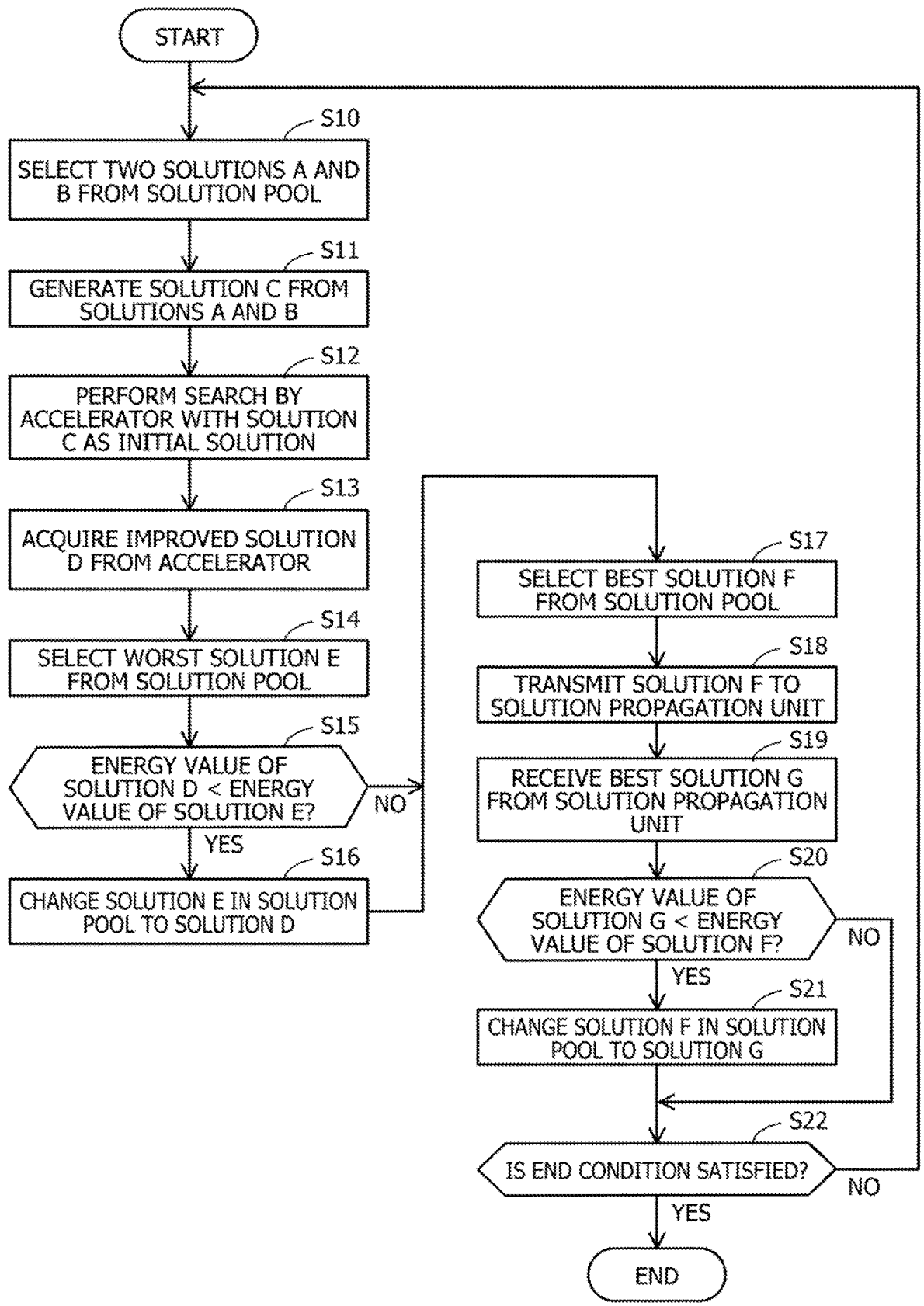
FIG. 7 is a flowchart illustrating a processing example of a search unit.

FIG. 7 is a flowchart illustrating a processing example of the search unit.

(S10) The search unit 140 selects two solutions A and B from the solution pool 141.

(S11) The search unit 140 generates the solution C from the solutions A and B. The method illustrated in FIG. 6 may be used as the method for generating the solution C.

(S12) The search unit 140 inputs the solution C to the accelerator 142, and searches for the solution by using the accelerator 142 with the solution C as the initial solution, for example, the start state.

(S13) When the search performed by the accelerator 142 for a predetermined period is ended, the search unit 140 acquires an improved solution D and the energy value of the solution D from the accelerator 142.

(S14) The search unit 140 selects a solution having a maximum energy value, for example, a worst solution E from the solution pool 141.

(S15) The search unit 140 determines whether or not the energy value of the solution D is smaller than the energy value of the solution E. When the energy value of the solution D is smaller than the energy value of the solution E, the search unit 140 advances the processing to step S16. When the energy value of the solution D is equal to or larger than the energy value of the solution E, the search unit 140 advances the processing to step S17.

(S16) The search unit 140 changes the solution E in the solution pool 141 to the solution D.

(S17) The search unit 140 selects a solution having a minimum energy value, for example, a best solution F from the solution pool 141.

(S18) The search unit 140 transmits the solution F and the energy value of the solution F to the solution propagation unit 180.

(S19) The search unit 140 receives a solution having a minimum energy value retained by the solution propagation unit 180, for example, a best solution G from the solution propagation unit 180. At this time, the search unit 140 receives the solution G and the energy value of the solution G from the solution propagation unit 180.

(S20) The search unit 140 determines whether or not the energy value of the solution G is smaller than the energy value of the solution F. When the energy value of the solution G is smaller than the energy value of the solution F, the search unit 140 advances the processing to step S21. When the energy value of the solution G is equal to or larger than the energy value of the solution F, the search unit 140 advances the processing to step S22.

(S21) The search unit 140 changes the solution F in the solution pool 141 to the solution G.

(S22) The search unit 140 determines whether or not the end condition is satisfied. When the end condition is satisfied, the search unit 140 ends the processing. When the end condition is not satisfied, the search unit 140 advances the processing to step S10.

The end condition of step S22 is given by the control unit 130. For example, the search unit 140 retains an end flag in the RAM of the accelerator card. An initial value of the end flag is "false". When an end signal is received from the control unit 130, the search unit 140 changes the end flag to "true". When the end flag is "false", the end condition is not satisfied. When the end flag is "true", the end condition is satisfied. For example, when a fixed period elapses after the search unit 140 starts the search according to the procedure in FIG. 7, the control unit 130 outputs the end signal to the search unit 140. The control unit 130 may set search periods of the respective search units 140, 150, 160, and 170 to different lengths.

Each of the search units 140, 150, 160, and 170 asynchronously execute the procedure illustrated in FIG. 7.

When the end condition is satisfied and the search is ended, the search unit 140 outputs a solution having a minimum energy value finally obtained to the control unit 130. When the search is ended in all the search units 140, 150, 160, and 170, the control unit 130 outputs the solutions output from the respective search units 140, 150, 160, and 170 or the solution having the minimum energy value among these solutions to the external storage device 200.

Next, a procedure of update processing of the solution buffer 181 of the solution propagation unit 180 will be described.

When an input solution A is received from any of the search units 140, 150, 160, and 170, the solution propagation unit 180 executes the following procedure.

Figure 8:
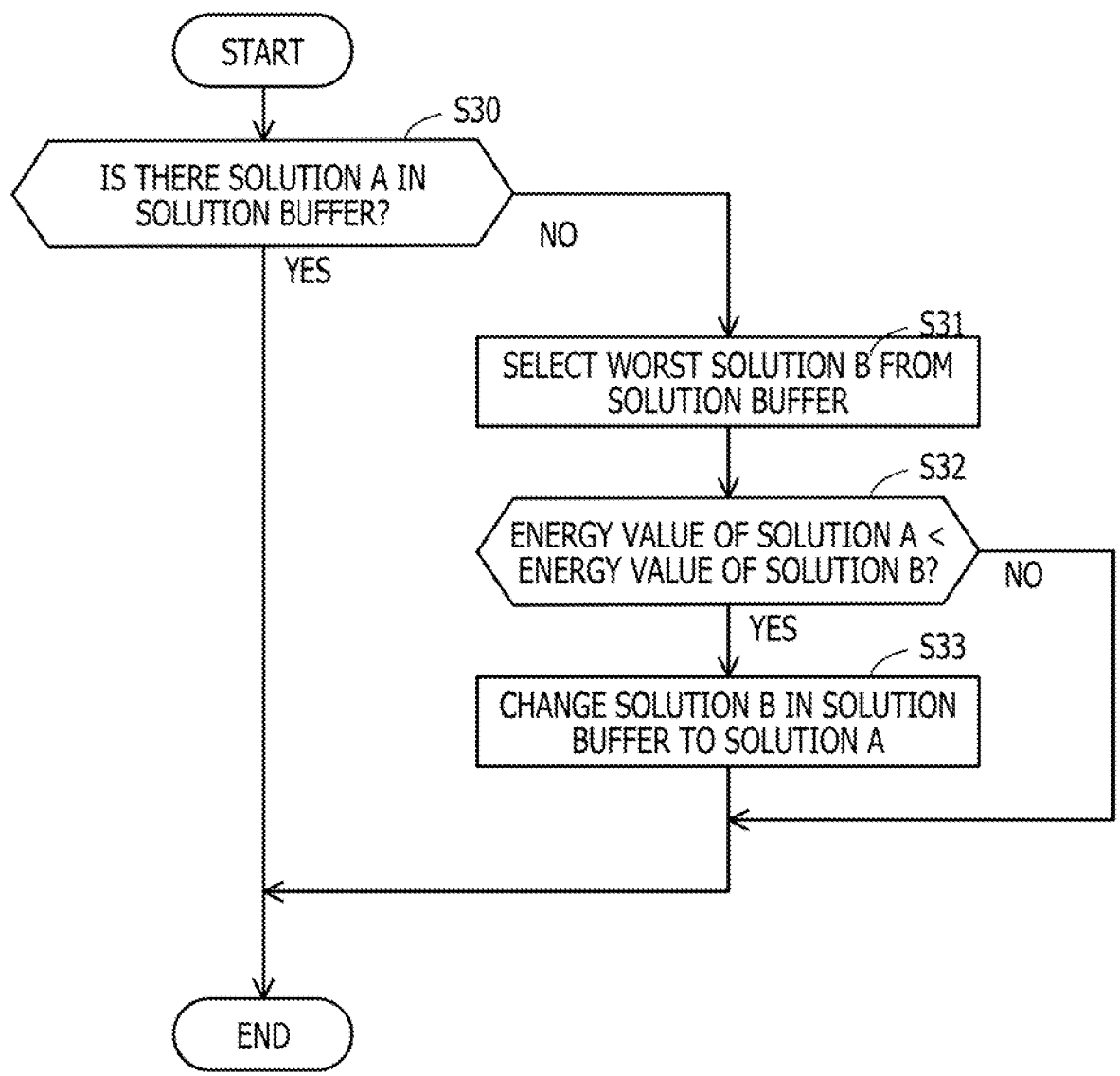
FIG. 8 is a flowchart illustrating an updating example of a solution buffer of a solution propagation unit.

FIG. 8 is a flowchart illustrating an updating example of the solution buffer of the solution propagation unit.

(S30) When the input solution A and an energy value of the input solution A are received from any of the search units 140, 150, 160, and 170, the solution propagation unit 180 determines whether or not there is the solution A identical to the input solution A in the solution buffer 181. When there is the solution A in the solution buffer 181, the solution propagation unit 180 ends the processing. When there is no solution A in the solution buffer 181, the solution propagation unit 180 advances the processing to step S31.

(S31) The solution propagation unit 180 selects a solution having a maximum energy value, for example, a worst solution B from the solution buffer 181.

(S32) The solution propagation unit 180 determines whether or not the energy value of the solution A is smaller than the energy value of the solution B. When the energy value of the solution A is smaller than the energy value of the solution B, the solution propagation unit 180 advances the processing to step S33. When the energy value of the solution A is equal to or larger than the energy value of the solution B, the solution propagation unit 180 ends the update processing of the solution buffer 181.

(S33) The solution propagation unit 180 changes the solution B in the solution buffer 181 to the solution A. The solution propagation unit 180 ends the update processing of the solution buffer 181.

In order to secure versatility of solutions, the solution propagation unit 180 may retain two or more solutions of which state bit strings corresponding to the states are different but energy values are the identical values.

Next, a procedure of solution output processing of the solution propagation unit 180 will be described.

Figure 9:
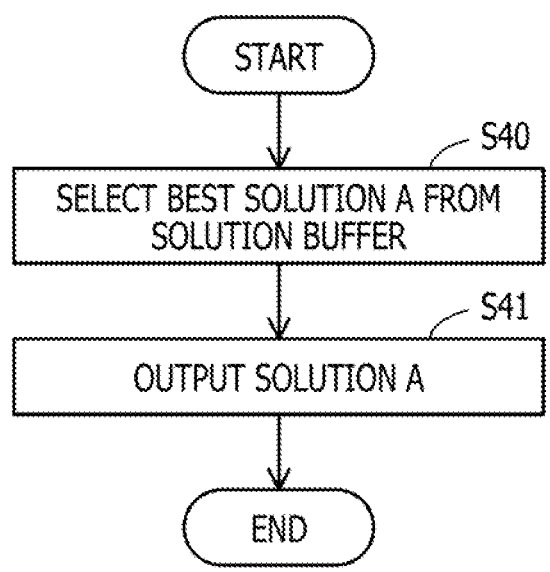
FIG. 9 is a flowchart illustrating a solution output example of the solution propagation unit.

FIG. 9 is a flowchart illustrating a solution output example of the solution propagation unit.

(S40) The solution propagation unit 180 selects a solution having a minimum energy value, for example, a best solution A from the solution buffer 181.

(S41) The solution propagation unit 180 outputs the solution A and the energy value of the solution A to each of the search units 140, 150, 160, and 170. The solution propagation unit 180 ends the solution output processing.

In step S40, when there is a plurality of solutions of which the energy values are minimum and states are different in the solution buffer 181, the solution propagation unit 180 randomly selects one from among the plurality of solutions.

When the input solution A in FIG. 8 is supplied from a certain search unit, the solution propagation unit 180 may execute the procedure of FIG. 9 for the search unit which is a supply source of the input solution A after the procedure of FIG. 8 is ended. Each of the search units 140, 150, 160, and 170 asynchronously acquire the best solutions in the solution buffer 181 from the solution propagation unit 180.

In accordance with the node 100 according to the second embodiment, the plurality of accelerators is operated in parallel, and the best solutions in each of the accelerators are mutually updated between the accelerators during a search period. For example, during a search operation, the best solutions in all the search units are reflected in the solution pools of each of the search units via the solution propagation unit 180. Thus, the start states of the next searches of each of the search units are generated based on the best solutions selected from the solution pools of each of the search units, and thus, the best solutions in all the search units at a certain timing are reflected in the start states of the next searches of each of the search units.

As described above, it is estimated that there may be some similarity between the solutions having relatively good energy values and there may be the optimal solution in the vicinity of these solutions. Accordingly, through the above-described processing procedure of the node 100, a possibility of reaching the optimal solution in any of the search units is increased, and the solution finding performance is improved compared to a case where each of the accelerators are independently operated.

Even for one problem, the ease of transition from a certain local solution to another solution may be different depending on the search method. For example, when falling into a certain local solution, even though it is relatively difficult to transition from the local solution to another solution in the first search method, it may be relatively easy to transition from the local solution to another solution in the second search method.

In the second embodiment, different search methods are used in each the accelerators. In the node 100, each accelerator generates the neighbor solution in the vicinity of the best solution based on the best solution propagated to each accelerator, and performs a search for the local solution with the neighbor solution as the start state. Accordingly, for example, an operation similar to the operation of searching for the next local solution from the local solution at a certain point may be realized by using the plurality of search methods, and the possibility of reaching the optimal solution is increased.

Alternatively, since there is a high possibility of reaching the optimal solution within a fixed time, a time taken until the optimal solution is obtained may be reduced. In this manner, the solution finding performance may be further improved.

The search units 140, 150, 160, and 170 may asynchronously execute the searches using the accelerators 142, 152, 162, and 172 by exchanging the solutions via the solution propagation unit 180. Accordingly, even though execution times of each of the accelerators are greatly different from each other, since a waiting time for exchanging the solutions does not occur, the solution may be efficiently searched for.

Third Embodiment

Next, a third embodiment will be described. Items different from the above-described second embodiment will be mainly discussed below while omitting explanations of the common items.

In the second embodiment, an example in which the information processing system includes one node 100 has been described.

Figure 10:
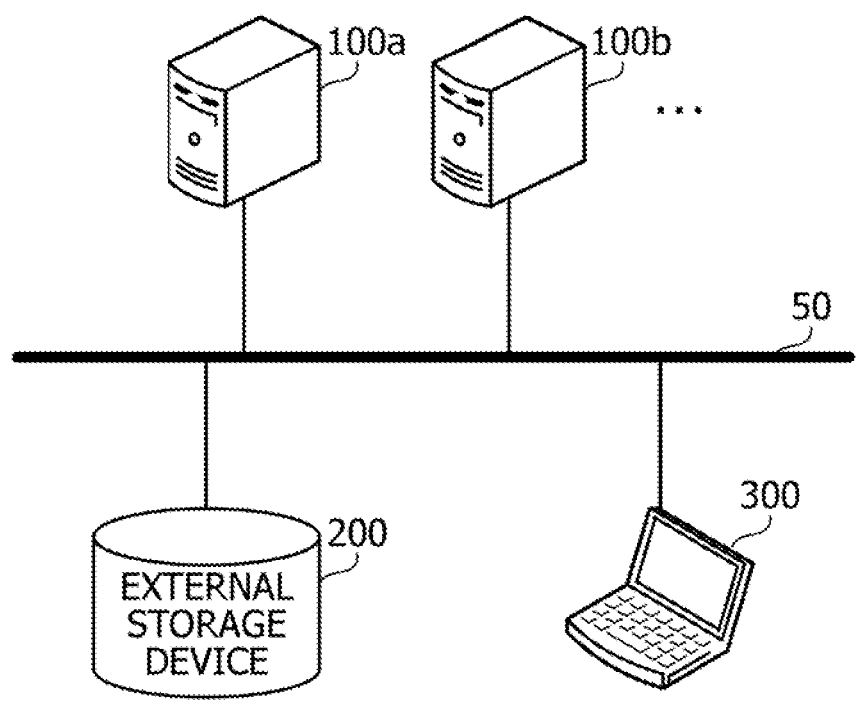
FIG. 10 is a diagram illustrating an example of an information processing system according to a third embodiment.

In the third embodiment, an example in which an information processing system includes a plurality of nodes will be described. In the description of the third embodiment, the hardware and functions identical to those in the second embodiment are denoted by the same reference numerals, and the description thereof may be omitted, FIG. 10 is a diagram illustrating an example of an information processing system according to the third embodiment.

The information processing system according to the third embodiment includes nodes 100a, 100b, . . . , an external storage device 200, and a terminal apparatus 300. The nodes 100a, 100b, . . . , the external storage device 200, and the terminal apparatus 300 are coupled to a network 50. The nodes 100a, 100b, . . . are realized by hardware similar to the node 100 according to the second embodiment.

The information processing system according to the third embodiment is an example of the information processing system 10 according to the first embodiment. The system including the nodes 100a, 100b, . . . may be considered as an example of the information processing system 10 according to the first embodiment.

Each of the nodes 100a, 100b, . . . according to the third embodiment includes one or more search units. The nodes 100a, 100b, . . . are different from the node 100 according to the second embodiment in that the nodes have the following functions. Although the node 100a will be mainly described below, the nodes 100b, . . . also have similar functions.

Figure 11:
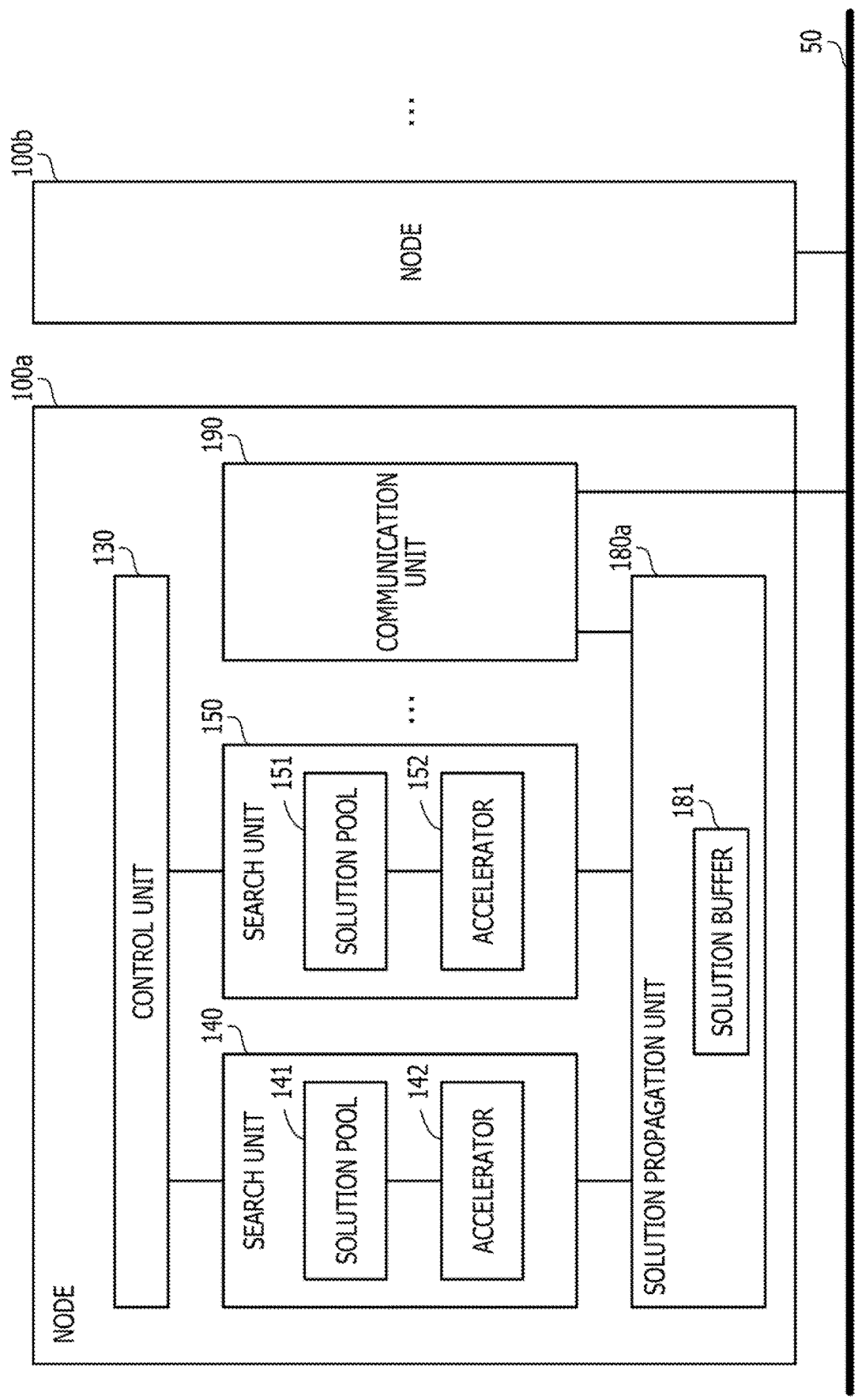
FIG. 11 is a diagram illustrating an example of functions of the node.

FIG. 11 is a diagram illustrating an example of functions of the node.

The node 100a includes a control unit 130, search units 140, 150, . . . , a solution propagation unit 180a, and a communication unit 190. The control unit 130 and the search units 140, 150, . . . correspond to the functions having the identical names in the second embodiment. The solution propagation unit 180a and the communication unit 190 are realized by the CPU 101.

The solution propagation unit 180a includes a solution buffer 181, and has functions similar to the solution propagation unit 180 according to the second embodiment for the search units 140, 150, . . .

The solution propagation unit 180a may receive a solution from the communication unit 190 and may update a solution in the solution buffer 181 with the solution supplied from the communication unit 190.

For example, the solution propagation unit 180a executes a procedure of updating the solution buffer 181 in FIG. 8 by using, as the input solution, not only the solutions supplied from the search units 140, 150, . . . but also the solution supplied from the communication unit 190.

For example, when the input solution supplied from any of the search units 140, 150, . . . or the communication unit 190 is included in the solution buffer 181, the solution propagation unit 180a discards the input solution, and skips the updating of the solution buffer 181. When the input solution is not included in the solution buffer 181, the solution propagation unit 180a compares an energy value of a solution having a maximum energy value in the solution buffer 181 with an energy value of the input solution. When the energy value of the input solution is smaller than the maximum energy value in the solution buffer 181, the solution propagation unit 180a replaces the solution having the maximum energy value in the solution buffer 181 with the input solution. When the energy value of the input solution is equal to or larger than the maximum energy value in the solution buffer 181, the solution propagation unit 180a discards the input solution without updating the solution buffer 181.

The solution propagation unit 180a outputs a solution having a minimum energy value in the solution buffer 181, for example, a best solution and an energy value of the best solution to the search units 140, 150, . . . and the communication unit 190.

The communication unit 190 transmits a best solution in the node 100a at a current point in time and an energy value of the best solution to the nodes 100b, . . . via the network 50. The communication unit 190 receives best solutions obtained at a current point in time in the respective nodes 100b, . . . and energy values of the best solutions from each of the nodes 100b, . . .

The communication unit 190 compares the energy values of the solutions received from all the other nodes with the best solution at the current point in time in the node 100a, and selects a solution Mmin having a minimum energy value. When there is a plurality of solutions of which energy values are minimum and state bit strings are different, the communication unit 190 randomly selects one from among the plurality of solutions.

The communication unit 190 outputs the selected solution Mmin and the energy value of the solution Mmin to the solution propagation unit 180a. Whether or not the solution Mmin is stored in the solution buffer 181 depends on the above-described operation of the solution propagation unit 180a.

When the solution Mmin is output to the solution propagation unit 180a, the communication unit 190 stops for a fixed time, and repeatedly executes the above-described operation after the fixed time elapses.

A parallel computing environment such as Open Message Passing Interface (MPI) may be used for the communication unit 190. For example, the communication unit 190 collects the best solutions obtained in each of the nodes through all-to-all communication with other communication units in all the other nodes.

Next, a processing procedure of the communication unit 190 will be described.

Figure 12:
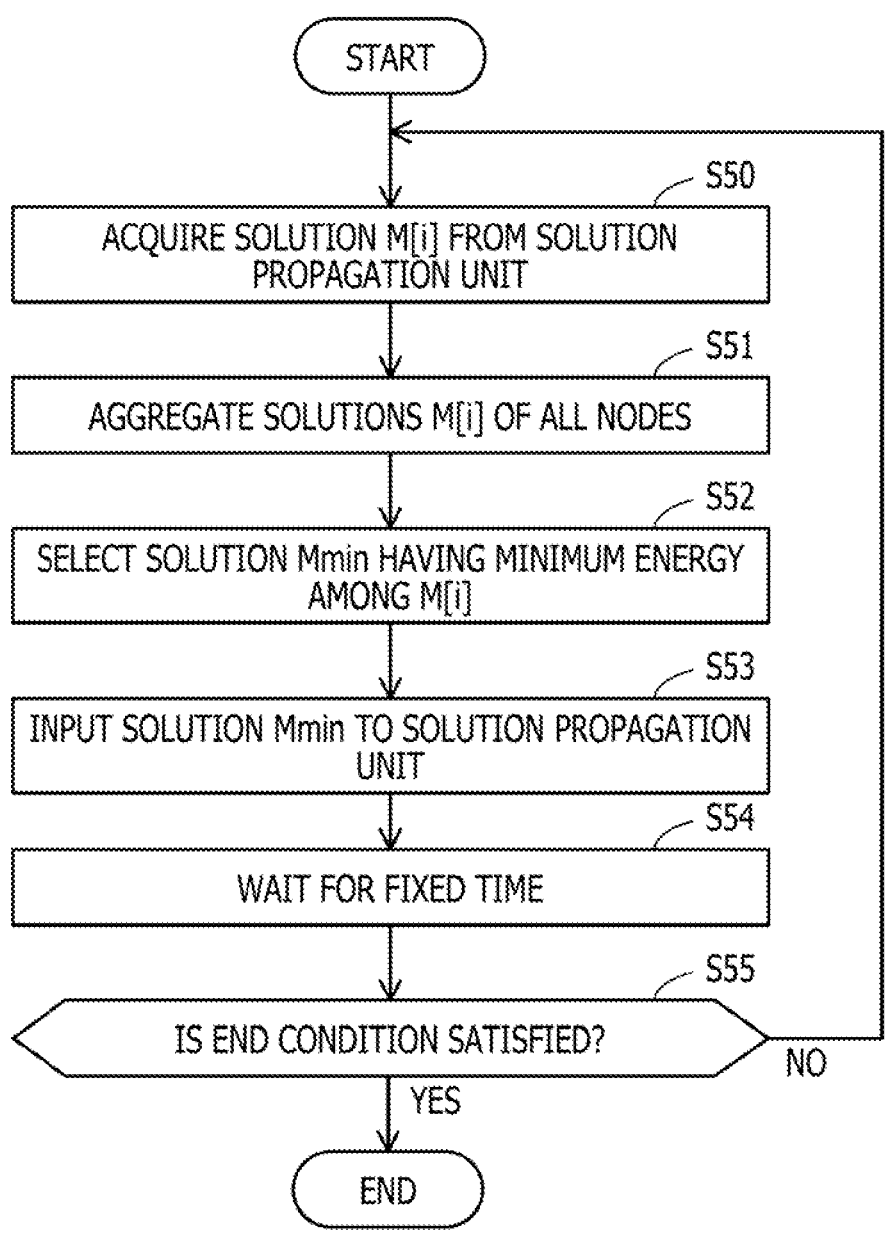
FIG. 12 is a flowchart illustrating a processing example of a communication unit.

FIG. 12 is a flowchart illustrating a processing example of the communication unit.

(S50) The communication unit 190 acquires a solution M [i] and an energy value of the solution M [I] from the solution propagation unit 180a. The solution M [I] is a solution having a minimum energy value among the solutions retained in the solution buffer 181. i is an identification number of the node, and has a value from 0 to (the number of nodes-1). i in step S50 corresponds to the identification number of the node 100.

(S51) The communication unit 190 aggregates the solutions M [I] and the energy values of the solutions M [i] of all the nodes. Accordingly, the communication unit 190 obtains the solutions M [I] corresponding to the number of nodes.

(S52) The communication unit 190 selects a solution Mmin having a minimum energy from among the solutions M [I]. When there is a plurality of solutions having a minimum energy, the communication unit 190 randomly selects one from among the plurality of solutions and sets the selected solution as the solution Mmin.

(S53) The communication unit 190 inputs the solution Mmin and the energy value of the solution Mmin to the solution propagation unit 180a.

(S54) The communication unit 190 waits for a fixed time.

(S55) The communication unit 190 determines whether or not an end condition is satisfied. When the end condition is satisfied, the communication unit 190 ends the processing. When the end condition is not satisfied, the communication unit 190 advances the processing to step S50.

The end condition of step S55 is given by the control unit 130. For example, the communication unit 190 retains an end flag in the RAM 102. An initial value of the end flag is "false". When an end signal is received from the control unit 130, the communication unit 190 changes the end flag to "true". When the end flag is "false", the end condition is not satisfied. When the end flag is "true", the end condition is satisfied. For example, when a fixed period elapses after the search unit 140 starts a search according to the procedure in FIG. 7, the control unit 130 outputs the end signal to the search unit 140 and the communication unit 190.

In accordance with the nodes 100a, 100b, . . . according to the third embodiment, a plurality of accelerators mounted in each of the nodes 100a, 100b, . . . is operated in parallel, and best solutions in the respective accelerators are mutually updated between the accelerators during a search period. For example, during a search operation, the best solutions in all the search units are reflected in the solution pools of the respective search units via the solution propagation unit 180a and the communication unit 190. Thus, the start states of the next searches of the respective search units are generated based on the best solutions selected from the solution pools of the respective search units, and thus, the best solutions in all the search units at a certain timing are reflected in the start states of the next searches of the respective search units.

Accordingly, a possibility of reaching the optimal solution in any of the search units is increased, and the solution finding performance is improved compared to a case where the individual accelerators are independently operated.

The search units in each of the nodes 100a, 100b, . . . exchange the solutions via the solution propagation unit 180a and the communication unit 190, and thus, the searches performed by the search units over the respective nodes may be asynchronously executed between the search units. Accordingly, even though execution times of the respective accelerators are greatly different from each other, since a waiting time for exchanging the solutions does not occur, the solution may be efficiently searched for.

Similar to each of the search units according to the second embodiment, different search methods may be used in each of the search units according to the third embodiment.

Figure 13:
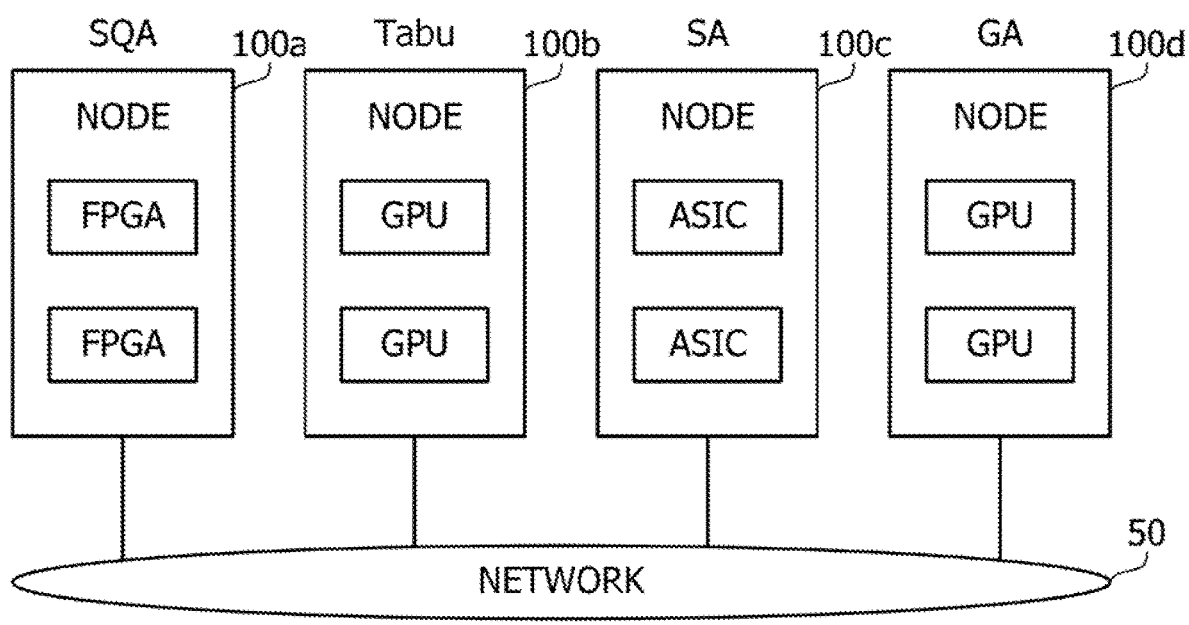
FIG. 13 is a diagram illustrating an example of an information processing system using a plurality of search methods.

FIG. 13 is a diagram illustrating an example of an information processing system using a plurality of search methods.

For example, it is assumed that the information processing system according to the third embodiment includes the nodes 100a, 100b, 100c, and 100d. The nodes 100a, 100b, 100c, and 100d are coupled to the network 50. For example, the search unit of the node 100a uses the SQA. The search unit of the node 100b uses the tabu search. The search unit of the node 100c uses the SA. The search unit of the node 100d uses the GA.

As illustrated in FIG. 13, the search methods may be different for each of the nodes, and the plurality of accelerators using the plurality of search methods may be mixed in one node. As described above, the accelerator is realized by the FPGA, the GPU, the ASIC or the like. As illustrated in the second embodiment, at least two types of semiconductor integrated circuits among the FPGA, the GPU, the ASIC, and the like may be mixed in one node.

Even for one problem, the ease of transition from a certain local solution to another solution may be different depending on the search method. For example, when falling into a certain local solution, even though it is relatively difficult to transition from the local solution to another solution in the first search method, it may be relatively easy to transition from the local solution to another solution in the second search method.

Figure 14:
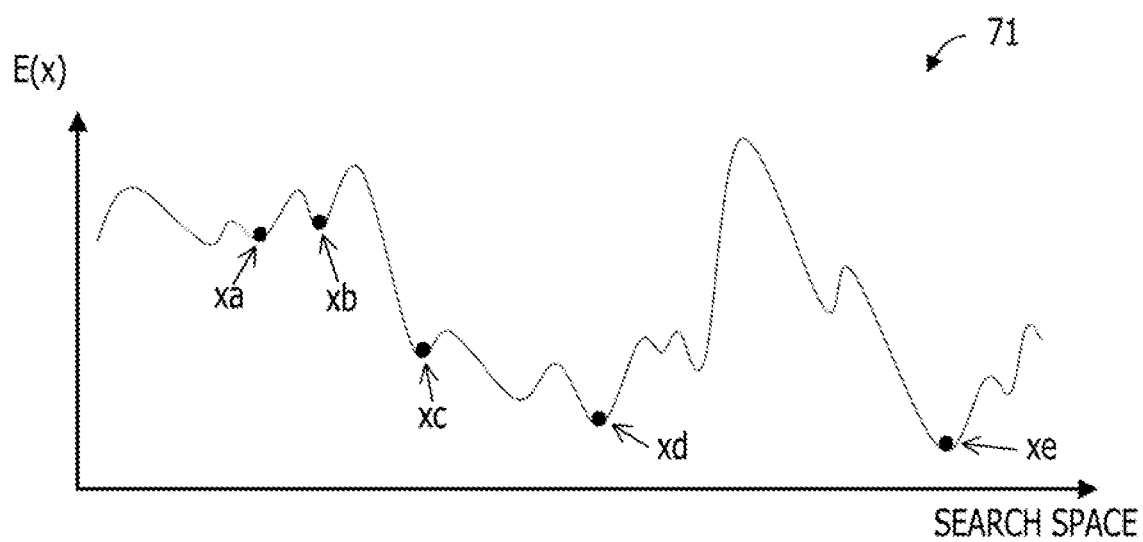
FIG. 14 is a diagram illustrating an example of characteristics of state transition for each search method.

FIG. 14 is a diagram illustrating an example of characteristics of a state transition for each search method.

A graph 71 depicts an energy value E(x) for each state (x) over a search space in a certain combinatorial optimization problem. A horizontal axis of the graph 71 indicates the search space. A vertical axis of the graph 71 indicates the energy value E(x). Each of states xa, xb, xc, xd, and xe that gives the minimum value of the energy value E(x) is a local solution. It is assumed that the state xe among these states is an optimal solution.

As described above, in a process of searching for solutions of a certain combinatorial optimization problem, an effective search method for reaching an optimal solution may be different for each point such as a local solution.

A table 72 indicates the ease of transition between the states in search methods 1 to 4. As one example of a transition order of the states for reaching the state xe from the state xa, it is considered to sequentially tracing xa, xb, xc, xd, and xe. The table 72 indicates the ease of transition between the states described in fields of transition for each of the search methods 1 to 4. A portion with a check mark in the table 72 indicates that the transition between the states is relatively likely to occur in the search method. A portion with a hyphen mark ("-") in the table 72 indicates that the transition between the states is relatively unlikely to occur in the search method.

For example, in the search method 1, there is a high possibility of reaching the state xd from the state xa via the states xb, and xc, but there is a low possibility of reaching the state xe from the state xd.

In the search method 2, there is a high possibility of reaching the state xc from the state xa via the state xb, but there is a low possibility of reaching the state xe from the state xc via the state xd.

In the search method 3, there is a high possibility of reaching the state xb from the state xa and there is a high possibility of reaching the state xe from the state xc via the state xd, but there is a low possibility of reaching the state xc from the state xb.

In the search method 4, there is a high possibility of reaching the state xb from the state xa and there is a high possibility of reaching the state xd from the state xc, but there is a low possibility of reaching the state xc from the state xb and there is a low possibility of reaching the state xe from the state xd.

As described above, even though any of the search methods 1 to 4 is used, transition between the states in the middle from the state xa to the state xe may be unlikely to occur.

In this case, for example, the search units do not reach the optimal solutions by a method for acquiring the best solution of the solutions obtained in the respective accelerators by just independently operating the accelerators using the plurality of search methods.

Thus, in the node 100 according to the second embodiment and the nodes 100a, 100b, . . . according to the third embodiment, each search unit generates the neighbor solution in vicinity of the best solution by the best solution propagated to each search unit, and each search unit performs the search with the neighbor solution as the start state. Accordingly, for example, an operation similar to the operation of searching for the next local solution from the local solution at a certain point may be realized by using the plurality of search methods, and the possibility of reaching the optimal solution is increased. Alternatively, since there is a high possibility of reaching the optimal solution within a fixed time, a time taken until the optimal solution is obtained may be reduced. In this manner, the solution finding performance may be improved.

In summary, the information processing systems according to the second and third embodiments have, for example, the following functions.

Each of the plurality of search units of the node 100 or the nodes 100a, 100b, . . . acquires the first solution corresponding to the best value among the values of the plurality of energy functions corresponding to the plurality of solutions from among the plurality of solutions obtained by the plurality of search units, generates the first state variable string based on the first solution, and searches for the solution with the generated first state variable string as the start state. Accordingly, the possibility of reaching the optimal solution may be increased and the solution finding performance may be improved compared with the case where the best solution among the solutions obtained by just independently operating the search units is acquired.

For example, at least two search units among the plurality of search units search for the solutions by using different search algorithms. As described above, the different search algorithms are combined, and thus, a possibility of escaping from the local solution difficult to be escaped by a single search algorithm is increased. Accordingly, the possibility of reaching the optimal solution may be increased.

The node 100 includes the solution propagation unit 180 that asynchronously acquires second solutions from the plurality of respective search units, decides the first solution from among the plurality of acquired second solutions, and asynchronously outputs the decided first solution to the plurality of respective search units.

Thus, the plurality of search units may asynchronously exchange the solutions via the solution propagation unit 180. Accordingly, even though the execution times of the respective search units are different from each other, since a waiting time for exchanging the solutions does not occur, the solution may be efficiently searched for. For example, search execution times may be greatly different between the search units using the different search algorithms. Thus, the function of the solution propagation unit 180 is useful, for example, when the different search algorithms are used in at least two search units.

The function of the solution propagation unit 180 may be realized by the CPU 101 as described above. The function of the solution propagation unit 180 may be realized by the semiconductor integrated circuit such as the FPGA and the ASIC. In this case, a solution propagation circuit realized by using the semiconductor integrated circuit functions as the solution propagation unit 180.

For example, each of the plurality of search units outputs the second solution corresponding to the best value of the energy function retained in the solution pool by the search unit to the solution propagation unit 180, and acquires the first solution from the solution propagation unit 180. When the first solution is different from the second solution, each of the plurality of search units replaces the second solution retained by the search unit with the first solution acquired from the solution propagation unit 180. Accordingly, the best solutions obtained by the plurality of search units, for example, the first solutions are appropriately reflected in each of the search units.

For example, the first solution and the first state variable string have the following relationship.

In the first example, the state variable string included in the first solution is a state variable string identical to the first state variable string. Accordingly, the first solution itself may be set as the start state for the next search.

In the second example, the state variable string included in the first solution is a state variable string in which a part of the plurality of state variables included in the first state variable string is changed. Accordingly, the neighbor solution of the first solution may be set as the start state of the next search.

The solution finding performance may be improved by using either the first example or the second example.

For example, each of the plurality of search units retains the solution pool including the plurality of solutions obtained by the search unit or the solution pool including the plurality of solutions obtained by replacing the second solution with the first solution, and generates the first state variable string based on two or more solutions selected from the solution pool.

Accordingly, the second example is implemented in the information processing system, and the solution finding performance may be improved. For example, there is a possibility that the first solution is included in two or more solutions selected from the solution pool, and in this case, the neighbor solution of the first solution may be set as the start state of the next search.

The information processing system according to the third embodiment includes a plurality of apparatuses each including one or more search units among the plurality of search units. The nodes 100a, 100b, . . . are examples of the plurality of apparatuses. The apparatus may be referred to as, for example, an information processing apparatus. Each of the plurality of apparatuses transmits, to the other apparatuses among the plurality of apparatuses, a third solution corresponding to a first best candidate value of the energy function obtained by one or more search units included in the apparatus, and receives, from the other apparatuses, fourth solutions corresponding to second best candidate values of the energy function obtained by the other apparatuses, Each of the plurality of apparatuses decides the first solution based on the comparison between the first best candidate value and the second best candidate value. The first best candidate value and the second best candidate value are values that are candidates for the best value among the values of the plurality of energy functions corresponding to the plurality of solutions obtained in each of the apparatuses.

Thus, even though the plurality of search units is arranged in the plurality of apparatuses in a distribution manner, the first solution may be appropriately decided by the plurality of respective search units and may be supplied to the respective search units, and the solution finding performance of the entire information processing system may be improved.

For example, each of the plurality of apparatuses includes a communication unit (for example, the communication unit 190) and a solution propagation unit (for example, the solution propagation unit 180a).

The communication unit of each of the plurality of apparatuses transmits the third solution to the other apparatuses, receives the fourth solutions from the other apparatuses, and outputs a candidate solution which is a candidate for the first solution among the third solution and the fourth solutions by the comparison between the first best candidate value of the energy value and the second best candidate value of the energy value.

The solution propagation unit of each of the plurality of apparatuses preferentially retains a predetermined number of solutions having good energy values among fifth solutions obtained by one or more search units included in the apparatus and the candidate solution output by the communication unit of the apparatus. The solution propagation unit of each of the plurality of apparatuses decides, as the first solution, the solution having the best energy value among the predetermined number of retained solutions, and outputs the decided first solution to one or more search units included in the apparatus.

Accordingly, the best solutions asynchronously obtained by each of the apparatuses are shared with the other apparatuses, and thus, one or more search units over each apparatus may appropriately acquire the first solution in the apparatus. As a result, the solution finding performance of the entire information processing system may be improved.

The function of the communication unit over each apparatus including the communication unit 190 may be realized by the CPU 101 as described above. However, the function of the communication unit may be realized by the semiconductor integrated circuit such as the FPGA or the ASIC. The function of the solution propagation unit over each apparatus including the solution propagation unit 180a may be realized by the CPU 101 as described above. The function of the solution propagation unit may be realized by the semiconductor integrated circuits such as the FPGA or the ASIC. For example, each of the apparatuses corresponding to the nodes 100a, 100b, . . . may include a plurality of processors or a plurality of processor cores. In this case, a first processor or a first processor core may execute the function of the communication unit 190, and a second processor or a second processor core may execute the function of the solution propagation unit 180a. Alternatively, a communication circuit and a solution propagation circuit realized by using the semiconductor integrated circuits such as the FPGAs may function as the communication unit 190 and the solution propagation unit 180a, respectively.

When each of the plurality of apparatuses includes two or more search units, the solution propagation unit of each of the plurality of apparatuses asynchronously acquires fifth solutions from two more search units included in the apparatus, and asynchronously outputs the selected first solution to the two or more search units.

Accordingly, the plurality of search units over the plurality of apparatuses may asynchronously exchange the solutions via the solution propagation unit (for example, the solution propagation unit 180a) on each apparatus. Accordingly, even though the execution times of each the search units are different from each other, since a waiting time for exchanging the solutions does not occur, the solution may be efficiently searched for. For example, search execution times may be greatly different between the search units using the different search algorithms. Thus, the function of the solution propagation unit over each apparatus including the solution propagation unit 180a is useful, for example, when different search algorithms are used in at least two search units on the identical apparatus.

Each of the plurality of search units generates the first state variable string by changing the value of a part of the state variables included in the first solution. As the generation method, for example, the method in FIG. 6 may be used. It is estimated that there is a high possibility that there is the optimal solution in the vicinity of a better solution among currently obtained solutions. Accordingly, the possibility of reaching the optimal solution may be increased by setting the neighbor solution of the first solution as the start state of the next search, and the solution finding performance may be improved.

The information processing according to the first embodiment may be realized by causing a processor such as a CPU that realizes the functions of the search units 11, 12, and 13 to execute a program. The information processing according to the second and third embodiments may be realized by causing the CPU 101 to execute a program. The program may be recorded in the recording medium 51 that is computer-readable.

For example, it is possible to circulate the program by distributing the recording medium 51 in which the program is recorded. The program may be stored in another computer, and the program may be distributed via a network. For example, the computer may store (install), in a storage device such as the RAM 102 or the HDD 103, the program recorded in the recording medium 51 or the program received from the other computer, and may read the program from the storage device to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a plurality of search devices including at least a first search device and a second search device, each search device of the plurality of search devices being coupled to each other via a computer network and including:
   a solution propagation circuit;
   a communication circuit coupled between the solution propagation circuit of the each search device and other search devices of the plurality of search devices via the computer network; and
   a plurality of accelerator circuitry each coupled to the solution propagation circuit, each accelerator circuit of the plurality of accelerator circuitry including:
   a first memory; and
   a first processor circuit coupled to the first memory and configured to perform processing including:
   the first processor circuit generating a plurality of solutions by iteratively performing a search for an optimal solution that is a state represented by values of a plurality of state variables included in an Ising-type energy function corresponding to a combinatorial optimization problem by using a respective search method associated with the each accelerator circuit of the each search device,
   the first processor circuit storing the plurality of solutions in a solution pool allocated in the first memory, each solution of the plurality of solutions including a state variable string and an energy value, the state variable string representing values of the plurality of state variables corresponding to the each solution, the energy value being a value of the Ising-type energy function with the state variable string,
   the first processor circuit generating a first state variable string based on the plurality of solutions stored in the solution pool, and
   the first processor circuit updating the plurality of solutions stored in the solution pool by performing a search for the optimal solution of the Ising-type energy function based on an initial state defined by the first state variable string,
   the processing performed by the first processor circuit of each search device of the plurality of search devices further includes:
   the first processor circuit selecting, from among the plurality of solutions stored in the solution pool, a first solution being a solution corresponding to a best energy value of the Ising-type energy function, and
   the first processor circuit transmitting the selected first solution to the solution propagation circuit of the each search device, the solution propagation circuit of the each search device of the plurality of search devices includes:
   a second memory; and
   a second processor circuit coupled to the second memory, the second processor circuit being configured to perform processing including:
   the second processor circuit storing a plurality of first solutions in a solution buffer allocated in the second memory by receiving the first solution from each of the plurality of accelerator circuitry,
   the second processor circuit selecting, from the solution buffer, a second solution being one of the plurality of first solutions and corresponding to a best energy value of the Ising-type energy function among the plurality of first solutions,
   the second processor circuit transmitting the second solution to at least any one of the plurality of accelerator circuitry to cause the first processor circuit of the any one of the plurality of accelerator circuitry to: update the plurality of solutions by adding the second solution into the plurality of solutions stored in the solution pool, perform the generating of the first state variable string, and perform the search for the optimal solution, and
   the second processor circuit transmitting the second solution to the communication circuit to cause the communication circuit to transmit the second solution to at least any one of the plurality of search devices via the computer network,
   the processing performed by the second processor circuit of the solution propagation circuit of the each search device of the plurality of search devices further includes:
   the second processor circuit receiving a third solution from at least any one of the plurality of search devices via the communication circuit and the computer network,
   the second processor circuit adding the received third solution into the plurality of first solutions stored in the solution buffer,
   the second processor circuit selecting the second solution from among the plurality of first solutions stored in the solution buffer, and
   the second processor circuit transmitting the second solution to at least any one of the plurality of accelerator circuitry to cause the first processor circuit of the any one of the plurality of accelerator circuitry to: update the plurality of solutions by adding the second solution into the plurality of solutions stored in the solution pool, perform the generating of the first state variable string, and perform the search for the optimal solution, and
   the search method used in the first search device is different from the search method used in the second search device in algorithm used in the search for the optimal solution.

2. The information processing system according to claim 1, wherein the first solution is a solution that corresponds to a best value of the Ising-type energy function among values of the Ising-type energy function obtained by using each of the plurality of solutions.

3. The information processing system according to claim 1, wherein the first state variable string includes values of the plurality of state variables when the first solution or the second solution is obtained.

4. The information processing system according to claim 1, wherein the first state variable string includes first values different in part from values of the plurality of state variables when the first solution or the second solution is obtained.

5. The information processing system according to claim 1, wherein the first processor circuit generates the first state variable string by changing a value of a part of the plurality of state variables included in the first solution.

* * * * *